(12) United States Patent
Sasaki et al.

(10) Patent No.: US 8,448,330 B2
(45) Date of Patent: May 28, 2013

(54) METHOD OF MANUFACTURING A THIN-FILM MAGNETIC HEAD

(75) Inventors: Yoshitaka Sasaki, Tokyo (JP); Tohru Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 146 days.

(21) Appl. No.: 13/067,462

(22) Filed: Jun. 2, 2011

(65) Prior Publication Data

US 2011/0252631 A1    Oct. 20, 2011

Related U.S. Application Data

(62) Division of application No. 12/591,299, filed on Nov. 16, 2009, now Pat. No. 7,975,367, which is a division of application No. 11/892,285, filed on Aug. 21, 2007, now Pat. No. 7,637,011, which is a division of application No. 10/790,049, filed on Mar. 2, 2004, now Pat. No. 7,275,305, which is a division of application No. 09/748,207, filed on Dec. 27, 2000, now Pat. No. 6,747,851.

(30) Foreign Application Priority Data

Feb. 10, 2000 (JP) .................................. 2000-33958

(51) Int. Cl.
*G11B 5/17* (2006.01)
*G11B 5/23* (2006.01)

(52) U.S. Cl.
USPC .................. 29/603.23; 29/603.24; 29/603.25; 360/123.25

(58) Field of Classification Search
USPC ............... 29/603.11, 603.23, 603.24, 603.25, 29/606; 438/626, 715; 360/123.25, 123.33
See application file for complete search history.

(56) References Cited

U.S. PATENT DOCUMENTS

| | | | |
|---|---|---|---|
| 4,677,036 A * | 6/1987 | Nakamura et al. | 29/603.24 X |
| 5,184,394 A * | 2/1993 | Hsie et al. | 29/603.25 X |
| 5,254,374 A | 10/1993 | Devlin et al. | |
| 5,487,918 A | 1/1996 | Akhtar | |

(Continued)

FOREIGN PATENT DOCUMENTS

| | | |
|---|---|---|
| JP | A-61-171155 | 8/1986 |
| JP | A-62-143223 | 6/1987 |

(Continued)

OTHER PUBLICATIONS

Xie et al., "MR Sensor Oxidation Mechanism at High Temperature", IEEE Transactions on Magnetics, vol. 35, No. 5, pages . 2619-2621, Sep. 1999.

(Continued)

*Primary Examiner* — A. Dexter Tugbang
(74) *Attorney, Agent, or Firm* — Oliff & Berridge, PLC

(57) ABSTRACT

A manufacturing method for a thin-film magnetic head including first and second magnetic layers, a gap layer, a thin-film coil, and a coil insulating layer for insulating neighboring ones of turns of the thin-film coil. The manufacturing method includes the steps of: forming the first magnetic layer; forming the gap layer on the first magnetic layer; forming the second magnetic layer on the gap layer; forming the thin-film coil; and forming the coil insulating layer. The coil insulating layer is formed by stacking a plurality of insulating films formed by chemical vapor deposition.

8 Claims, 15 Drawing Sheets

U.S. PATENT DOCUMENTS

| | | | |
|---|---|---|---|
| 5,530,609 A | 6/1996 | Koga et al. | |
| 5,614,247 A | 3/1997 | Barbee et al. | |
| 5,626,922 A | 5/1997 | Miyanaga et al. | |
| 5,763,021 A | 6/1998 | Young et al. | |
| 5,809,636 A | 9/1998 | Shouji et al. | |
| 5,811,018 A | 9/1998 | Ewasko et al. | |
| 5,981,399 A * | 11/1999 | Kawamura et al. | 438/715 |
| 6,018,862 A | 2/2000 | Stageberg et al. | |
| 6,024,886 A | 2/2000 | Han et al. | |
| 6,083,410 A | 7/2000 | Ikegawa et al. | |
| 6,103,557 A * | 8/2000 | Nakanishi | 438/626 X |
| 6,195,872 B1 | 3/2001 | Sasaki | |
| 6,333,841 B1 | 12/2001 | Sasaki | |
| 6,459,551 B1 | 10/2002 | Hayakawa | |
| 6,477,004 B2 | 11/2002 | Sasaki | |
| 6,922,316 B2 | 7/2005 | Sato et al. | |
| 2001/0000984 A1 | 5/2001 | Sasaki | |

FOREIGN PATENT DOCUMENTS

| | | |
|---|---|---|
| JP | A-02-308533 | 12/1990 |
| JP | A-04-232250 | 8/1992 |
| JP | 05225523 A * | 9/1993 |
| JP | A-09-091618 | 4/1997 |
| JP | A-11-269652 | 10/1999 |
| JP | A-11-039614 | 12/1999 |
| JP | A-11-353616 | 12/1999 |
| WO | WO 99/41739 | 8/1999 |

OTHER PUBLICATIONS

Ericsson et al.; "Properties of $Al_2O_3$-films deposited on silicon by atomic layer epitaxy"; Microelectronic Engineering 36 (1997) 91-94.

Quayle Action mailed Feb. 9, 2006 in U.S. Appl. No. 10/790,067, filed Mar. 2, 2004, issued as U.S. Patent No. 7,075,757 B2 on Jul. 11, 2006—Sasaki et al.

Office Action mailed Nov. 1, 2010 in U.S. Appl. No. 12/591,299.

Office Action mailed Mar. 19, 2009 in U.S. Appl. No. 11/892,285.

Office Action mailed Jan. 24, 2007 in U.S. Appl. No. 10/790,049.

Office Action mailed Oct. 22, 2003 in U.S. Appl. No. 09/748,207.

* cited by examiner

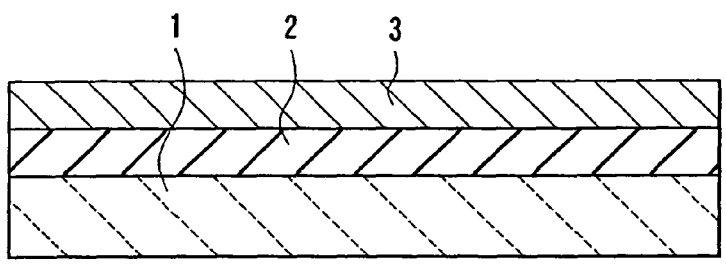 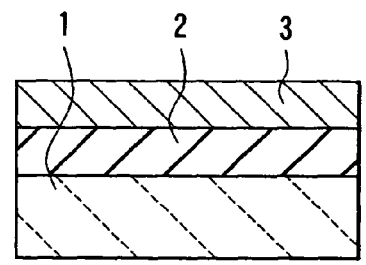
FIG. 1A    FIG. 1B
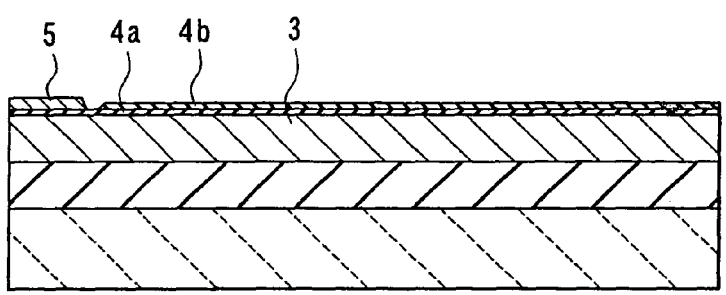 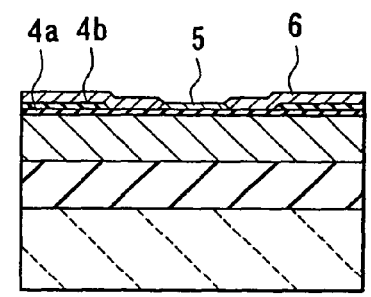
FIG. 2A    FIG. 2B

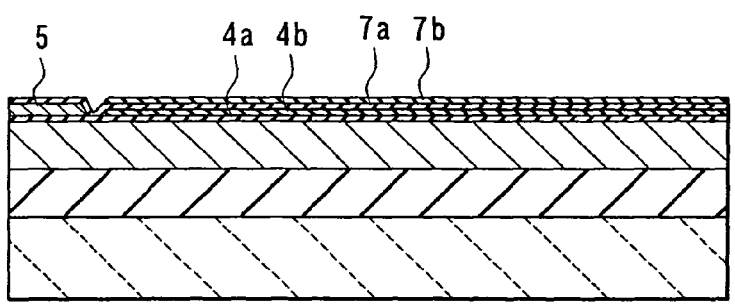
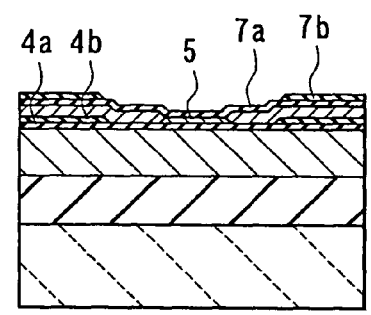
FIG. 3A
FIG. 3B
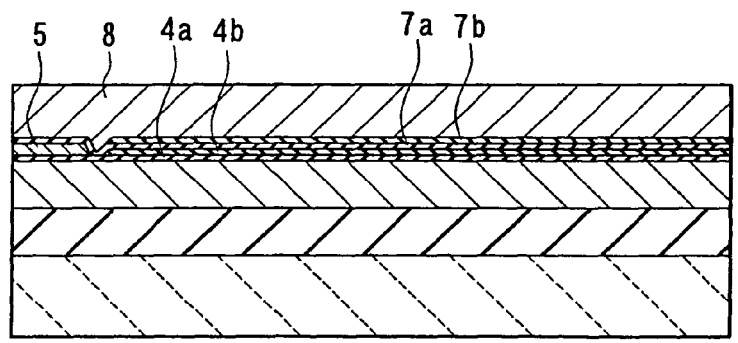
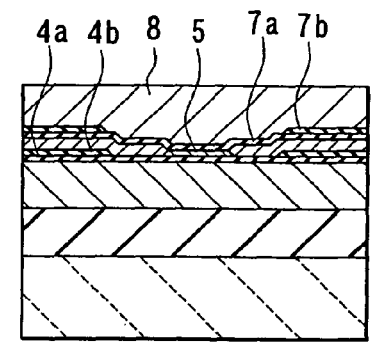
FIG. 4A
FIG. 4B

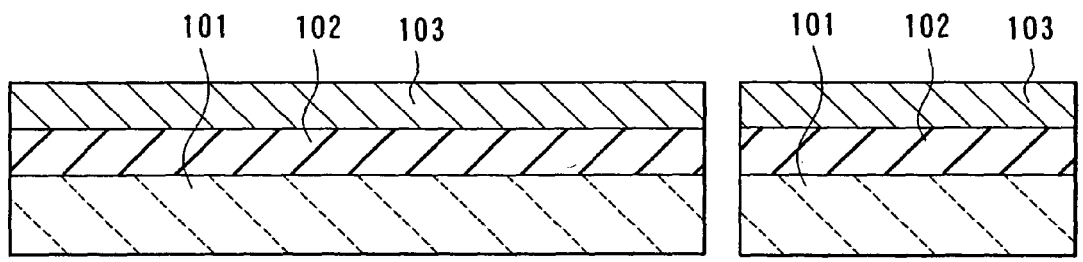
FIG. 16A
RELATED ART
FIG. 16B
RELATED ART
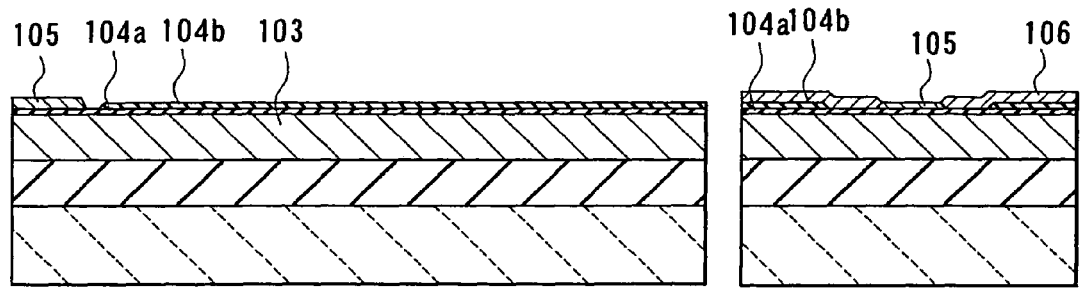
FIG. 17A
RELATED ART
FIG. 17B
RELATED ART

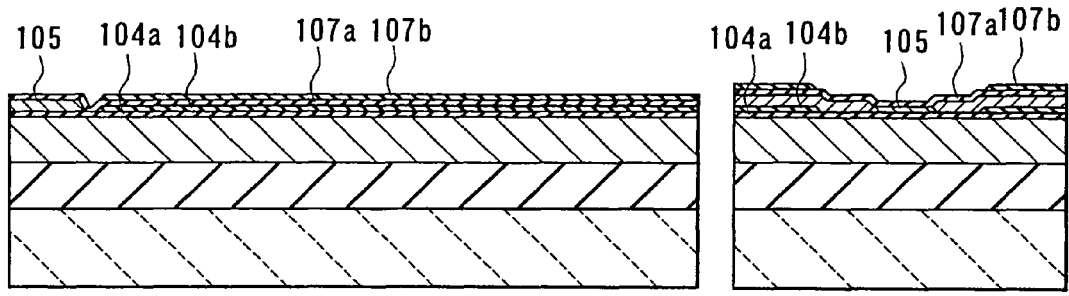
FIG. 18A
RELATED ART
FIG. 18B
RELATED ART
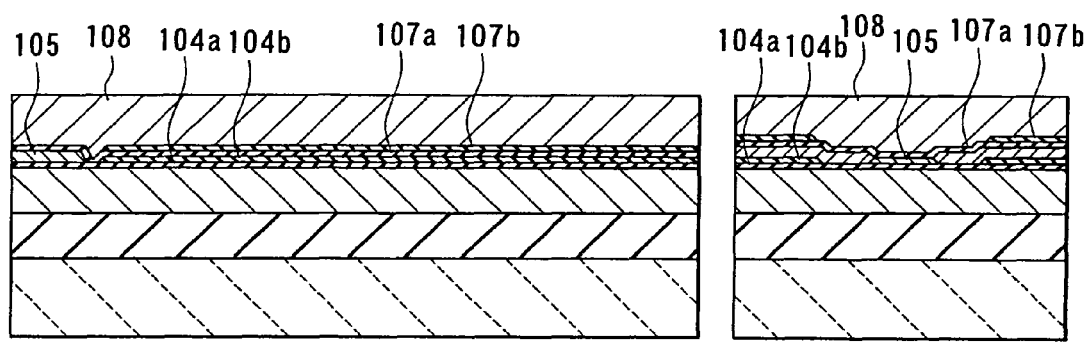
FIG. 19A
RELATED ART
FIG. 19B
RELATED ART

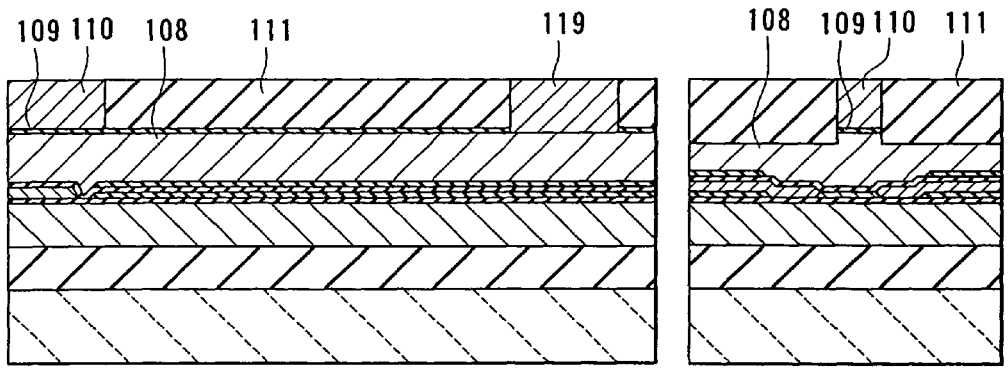
FIG. 20A
RELATED ART
FIG. 20B
RELATED ART
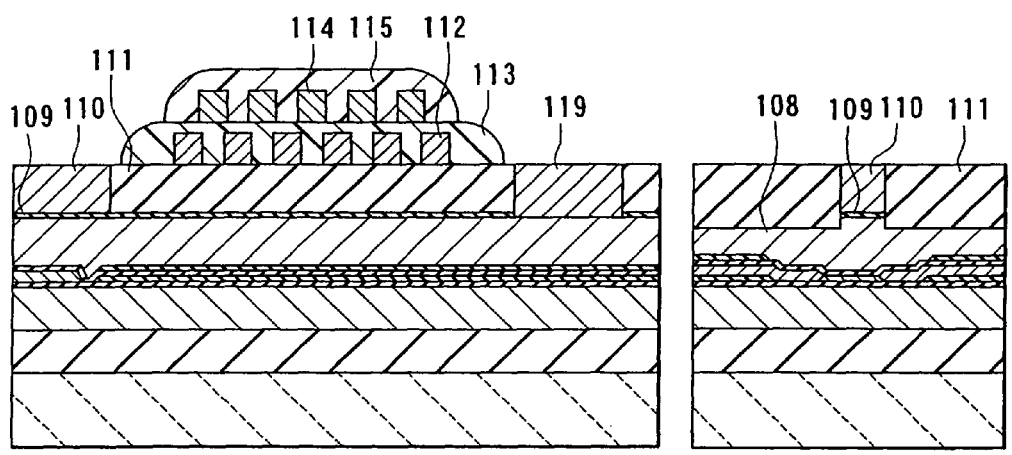
FIG. 21A
RELATED ART
FIG. 21B
RELATED ART

METHOD OF MANUFACTURING A THIN-FILM MAGNETIC HEAD

This is a Division of Application No. 12/591,299, filed Nov. 16, 2009, now U.S Pat. No. 7,975,367, issued Jul. 12, 2011, which is a Division of application Ser. No. 11/892,285, filed Aug. 21, 2007, now U.S. Pat. No. 7,637,011, issued Dec. 29, 2009, which is a Division of application Ser. No. 10/790,049, filed Mar. 2, 2004, now U.S. Pat. No. 7,275,305, issued Oct. 2, 2007, which in turn is a Division of application Ser. No. 09/748,207, filed Dec. 27, 2000, now U.S. Pat. No. 6,747,851, issued Jun. 8, 2004. The entire disclosures of the prior applications are hereby incorporated by reference in their entirety.

BACKGROUND OF THE INVENTION

1. Field of Invention

The present invention relates to a thin-film magnetic head having at least one of an induction-type electromagnetic transducer and a magnetoresistive element, and to a method of manufacturing such a thin-film magnetic head.

2. Description of Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal density is more than 1 gigabit per square inch. A GMR head is used as a reproducing head where areal density is more than 3 gigabits per square inch. It is GMR heads that have been most widely used recently.

The performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the recording track density in order to increase the areal density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. This width is one of the factors that determine the recording head performance. Semiconductor process techniques are utilized to implement such a structure. Another factor is a pattern width such as the throat height, in particular. The throat height is the length (height) of pole portions, that is, portions of magnetic pole layers facing each other with a recording gap layer in between, between the air-bearing-surface-side end and the other end. A reduction in throat height is desired in order to improve the recording head performance. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift (NLTS).

Reference is now made to FIG. 16A to FIG. 22A and FIG. 16B to FIG. 22B to describe an example of a manufacturing method of a related-art thin-film magnetic head element. FIG. 16A to FIG. 22A are cross sections each orthogonal to the air bearing surface. FIG. 16B to FIG. 22B are cross sections of the pole portions each parallel to the air bearing surface.

According to the manufacturing method, as shown in FIG. 16A and FIG. 16B, an insulating layer 102 made of alumina ($Al_2O_3$), for example, having a thickness of about 5 to 10 µm, is deposited on a substrate 101 made of aluminum oxide and titanium carbide ($Al_2O_3$—TiC), for example. Next, on the insulating layer 102, a bottom shield layer 103 made of a magnetic material and having a thickness of 2 to 3 µm, for example, is formed for a reproducing head.

Next, as shown in FIG. 17A and FIG. 17B, a shield gap film 104a made of an insulating material such as alumina and having a thickness of 10 to 20 nm, for example, is formed through sputtering, for example, on the bottom shield layer 103. Next, a shield gap film 104b made of an insulating material such as alumina and having a thickness of 100 nm, for example, is formed through sputtering, for example, on the shield gap film 104a except a region where a GMR element described later will be formed. The shield gap film 104b is provided for preventing a short circuit between the GMR element and the bottom shield layer 103.

Next, on the shield gap film 104b, a film having a thickness of 40 to 50 nm, for example, to make up the GMR element for reproduction is formed through a method such as sputtering. This film is etched with a photoresist pattern not shown as a mask to form the GMR element 105.

Next, a pair of conductive layers (that may be called leads) 106 are formed by liftoff through the use of the above-mentioned photoresist pattern. The conductive layers 106 are electrically connected to the GMR element 105. The photoresist pattern is then removed.

Next, as shown in FIG. 18A and FIG. 18B, a shield gap film 107a made of an insulating material such as alumina and having a thickness of 10 to 20 nm, for example, is formed through sputtering, for example, on the shield gap films 104a and 104b, the GMR element 105 and the conductive layers 106. The GMR element 105 is embedded in the shield gap films 104a and 107a. Next, a shield gap film 107b made of an insulating material such as alumina and having a thickness of 100 nm, for example, is formed through a method such as sputtering on the shield gap film 107a except the neighborhood of the GMR element 105.

Next, as shown in FIG. 19A and FIG. 19B, on the shield gap films 107a and 107b, a top-shield-layer-cum-bottom-pole-layer (called a top shield layer in the following description) 108 is formed. The top shield layer 108 has a thickness of about 3 and is made of a magnetic material and used for both the reproducing head and the recording head.

Next, as shown in FIG. 20A and FIG. 20B, a recording gap layer 109 made of an insulating film such as an alumina film and having a thickness of 0.2 µm, for example, is formed on the top shield layer 108. Next, a portion of the recording gap layer 109 located in the center of the region where a thin-film coil described later is to be formed is etched to form a contact hole for making a magnetic path. Next, a top pole tip 110 for the recording head is formed on the recording gap layer 109 in the pole portion. The top pole tip 110 is made of a magnetic material and has a thickness of 1.0 to 1.5 µm. At the same time, a magnetic layer 119 made of a magnetic material is formed for making the magnetic path in the contact hole for making the magnetic path.

Next, the recording gap layer 109 and a part of the top shield layer 108 are etched through ion milling, using the top pole tip 110 as a mask. As shown in FIG. 20B, the structure is called a trim structure wherein the sidewalls of the top pole portion (the top pole tip 110), the recording gap layer 109, and a part of the top shield layer 108 are formed vertically in a self-aligned manner.

Next, an insulating layer 111 of alumina, for example, having a thickness of about 3 µm is formed over the entire surface. The insulating layer 111 is polished to the surfaces of the top pole tip 110 and the magnetic layer 119 and flattened.

Next, as shown in FIG. 21A and FIG. 21B, on the flattened insulating layer 111 a first layer 112 of the thin-film coil is made for the induction-type recording head. The first layer 112 of the coil is made of copper (Cu), for example. Next, a photoresist layer 113 is formed into a specific shape on the insulating layer 111 and the first layer 112 of the coil. Next, a second layer 114 of the thin-film coil is formed on the photoresist layer 113. Next, a photoresist layer 115 is formed into a specific shape on the photoresist layer 113 and the second layer 114 of the coil.

Next, as shown in FIG. 22A and FIG. 22B, a top pole layer 116 for the recording head is formed on the top pole tip 110, the photoresist layers 113 and 115 and the magnetic layer 119. The top pole layer 116 is made of a magnetic material such as Permalloy. Next, an overcoat layer 117 of alumina, for example, is formed to cover the top pole layer 116. Finally, machine processing of the slider including the forgoing layers is performed to form the air bearing surface 118 of the thin-film magnetic head including the recording head and the reproducing head. The thin-film magnetic head is thus completed.

FIG. 23 is a top view of the thin-film magnetic head shown in FIG. 22A and FIG. 22B. The overcoat layer 117 and the other insulating layers and film are omitted in FIG. 27.

In order to improve the performance characteristics of a hard disk drive, such as areal recording density, in particular, a method of increasing linear recording density and a method of increasing track density may be taken. To design a high-performance hard disk drive, specific measures taken for implementing the recording head, the reproducing head or the thin-film magnetic head as a whole depend on whether linear recording density or track density is emphasized. That is, if priority is given to track density, a reduction in track width is required for both recording head and reproducing head, for example. If priority is given to linear recording density, it is required for the reproducing head to improve the reproducing output and to reduce the half width of the reproducing output. Moreover, it is required to reduce the distance between the hard disk platter and the slider (hereinafter called a magnetic space). To achieve areal density of 20 to 30 gigabits per square inch, a magnetic space of 15 to 25 nm, for example, is required.

Consideration will now be given to the measures taken when priority is given to linear recording density. Among the factors that contribute to improvements in linear recording density, a reduction in magnetic space is achieved by reducing the amount of floating of the slider. The amount of floating of the slider depends mainly on the design, processing method, lapping method and so on of the slider.

Among the factors that contribute to improvements in linear recording density, an improvement in reproducing output is achieved mainly by replacing the AMR film with a GMR film and the like having an excellent magnetoresistive sensitivity. It is known that another factor, that is, a reduction in half width of the reading output, is achieved by reducing the distance between the bottom shield layer and the top shield layer (hereinafter called the shield gap length). It is possible to control the shield gap length it the steps of manufacturing the thin-film magnetic head.

The problems arising when the shield gap length is reduced will now be described. To implement areal recording density of about 10 gigabits per square inch, an appropriate shield gap length is 0.11 to 0.14 µm (110 to 140 nm). However, a shield gap length of 0.07 to 0.09 µm (70 to 90 nm) is required for implementing areal recording density of 30 to 40 gigabits per square inch.

It is difficult to reduce the thickness of the MR element since this thickness is determined by factors such as the reading output required. Therefore, in order to reduce the shield gap length, it is required to reduce the thickness of the shield gap film provided between the MR element and the bottom shield layer, and the thickness of the shield gap film provided between the MR element and the top shield layer.

A case is assumed wherein a shield gap length of 60 to 70 nm is required to implement areal recording density of 40 gigabits per square inch. In this case, if the thickness of the MR element is 40 nm, the thickness of the shield gap films each of which is provided between the MR element and the bottom shield layer and between the MR element and the top shield layer, respectively, is required to be 10 to 15 nm.

In prior art the shield gap film is made of an alumina film formed through sputtering performed in a plasma atmosphere through the use of an apparatus such as a radio frequency (RF) sputtering apparatus or an electron cyclotron resonance (ECR) sputtering apparatus.

However, a reduction in the thickness of the prior-art shield gap film formed through sputtering is limited to about 20 nm. That is, if the thickness of the prior-art shield gap film is smaller than 20 nm, the insulation strength is 5 to 7 volts or smaller so that static damage is likely to occur. If the thickness of the prior-art shield gap film is reduced down to about 10 to 15 nm, not only the insulation strength is made smaller but also pinholes are likely to occur. If static damage is done to the shield gap film or pinholes are made in the shield gap film, a short circuit is developed between the MR element and the bottom shield layer or the top shield layer. As a result, the reading output signal carries noise, and it is impossible to obtain a proper reading output signal in some cases.

In addition, the prior-art shield gap film exhibits bad step coverage. Therefore, pinholes or faulty insulation frequently occurs in portions having projections and depressions, in particular, such as the neighborhood of the pattern edge of the MR element or the leads connected to the MR element.

As thus described, it is difficult in prior art to form the shield gap film that is thin and exhibits high qualities, that is, closely packed and has an even thickness, greater insulation strength and excellent step coverage. Therefore, it is difficult to reduce the shield gap length of the prior art thin-film magnetic head, and to reduce the half width of the reading output and to improve the recording density. In addition, since it is difficult in prior art to form a high-quality and thin shield gap film, the yield of thin-film magnetic heads for high density recording is low.

Although the problems arising when the shield gap film is formed have been described so far, similar problems are found in formation of layers such as the recording gap layer, an insulating film of a thin-film magnetic head wherein the recording head and the reproducing head are isolated from each other by the insulating film, or an insulating layer for isolating turns of the coil.

SUMMARY OF THE INVENTION

It is an object of the invention to provide a thin-film magnetic head and a method of manufacturing the same for improving the performance characteristics and the yield by providing a high-quality insulating film.

A first thin-film magnetic head of the invention comprises: a medium facing surface that faces toward a recording medium; a magnetoresistive element; a first shield layer and a second shield layer for shielding the magnetoresistive element, the shield layers having portions located on a side of the medium facing surface and opposed to each other, the magnetoresistive element being placed between these portions of the shield layers; a first shield gap film, provided between the magnetoresistive element and the first shield layer, for insulating the magnetoresistive element and the first shield layer from each other; and a second shield gap film, provided between the magnetoresistive element and the second shield layer, for insulating the magnetoresistive element and the second shield layer from each other. At least one of the first and second shield gap films is made of a plurality of insulating films stacked that are formed by chemical vapor deposition.

A second thin-film magnetic head of the invention comprises: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The gap layer is made of a plurality of insulating films stacked that are formed by chemical vapor deposition.

A third thin-film magnetic head of the invention comprises: a medium facing surface that faces toward a recording medium; a reproducing head; a recording head; and an isolation film for magnetically isolating the reproducing head and the recording head from each other. The reproducing head incorporates: a magnetoresistive element; a first shield layer and a second shield layer for shielding the magnetoresistive element, the shield layers having portions located on a side of the medium facing surface and opposed to each other, the magnetoresistive element being placed between these portions of the shield layers; a first shield gap film, provided between the magnetoresistive element and the first shield layer, for insulating the magnetoresistive element and the first shield layer from each other; and a second shield gap film, provided between the magnetoresistive element and the second shield layer, for insulating the magnetoresistive element and the second shield layer from each other. The recording head incorporates: a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The isolation film is made of a plurality of insulating films stacked that are formed by chemical vapor deposition.

A fourth thin-film magnetic head of the invention comprises: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; a thin-film coil at least a part of which is placed between the first and second magnetic layers, the at least part of the coil being insulated from the first and second magnetic layers; and a coil insulating layer for insulating neighboring ones of turns of the coil from each other. The coil insulating layer is made of a plurality of insulating films stacked that are formed by chemical vapor deposition.

According to the first to fourth thin-film magnetic heads of the invention, one of the first and second shield gap films, the gap layer, the isolation film, or the coil insulating layer is made of a plurality of insulating films stacked that are formed by chemical vapor deposition, and exhibits high quality.

According to the first to fourth thin-film magnetic heads of the invention, the insulating films formed by chemical vapor deposition may be alumina films.

A first method of the invention is provided for manufacturing a thin-film magnetic head comprising: a medium facing surface that faces toward a recording medium; a magnetoresistive element; a first shield layer and a second shield layer for shielding the magnetoresistive element, the shield layers having portions located on a side of the medium facing surface and opposed to each other, the magnetoresistive element being placed between these portions of the shield layers; a first shield gap film, provided between the magnetoresistive element and the first shield layer, for insulating the magnetoresistive element and the first shield layer from each other; and a second shield gap film, provided between the magnetoresistive element and the second shield layer, for insulating the magnetoresistive element and the second shield layer from each other. The method includes the steps of: forming the first shield layer; forming the first shield gap film on the first shield layer; forming the magnetoresistive element on the first shield gap film; forming the second shield gap film on the magnetoresistive element; and forming the second shield layer on the second shield gap film. At least one of the first and second shield gap films is formed by stacking a plurality of insulating films formed by chemical vapor deposition.

A second method of the invention is provided for manufacturing a thin-film magnetic head comprising: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of: forming the first magnetic layer; forming the gap layer on the first magnetic layer; forming the second magnetic layer on the gap layer; and forming the thin-film coil. The gap layer is formed by stacking a plurality of insulating films formed by chemical vapor deposition.

A third method of the invention is provided for manufacturing a thin-film magnetic head comprising: a medium facing surface that faces toward a recording medium; a reproducing head; a recording head; and an isolation film for magnetically isolating the reproducing head and the recording head from each other. The reproducing head incorporates: a magnetoresistive element; a first shield layer and a second shield layer for shielding the magnetoresistive element, the shield layers having portions located on a side of the medium facing surface and opposed to each other, the magnetoresistive element being placed between these portions of the shield layers; a first shield gap film, provided between the magnetoresistive element and the first shield layer, for insulating the magnetoresistive element and the first shield layer from each other; and a second shield gap film, provided between the magnetoresistive element and the second shield layer, for insulating the magnetoresistive element and the second shield layer from each other. The recording head incorporates: a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of: forming the reproducing head; forming the recording head; and forming the isolation film. The isolation film is formed by stacking a plurality of insulating films formed by chemical vapor deposition.

A fourth method of the invention is provided for manufacturing a thin-film magnetic head comprising: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; a thin-film coil at least a part of which is placed between the first and second magnetic layers, the at least part of the coil being insulated from the first and second magnetic layers; and a coil insulating layer for insulating neighboring ones of turns of the coil from each other. The method includes the steps of: forming the first magnetic layer; forming the gap layer on the first magnetic layer; forming the second magnetic layer on the gap layer; forming the thin-film coil; and forming the coil insulating layer. The coil insulating layer is formed by stacking a plurality of insulating films formed by chemical vapor deposition.

According to the first to fourth methods of the invention, the insulating films formed by the chemical vapor deposition may be alumina films.

According to the first to fourth methods of the invention, the chemical vapor deposition may be low pressure chemical vapor deposition, or may be plasma chemical vapor deposition or atmospheric pressure chemical vapor deposition.

According to the first to fourth methods of the invention, the insulating films formed by the chemical vapor deposition may be formed through the use of a plurality of chambers.

According to the first to fourth methods of the invention, the insulating films formed by the chemical vapor deposition may be formed through intermittently injecting a material for making the films. In this case, the insulating films formed by the chemical vapor deposition may be alumina films formed through intermittently injecting $H_2O$, $N_2O$ or $H_2O_2$ which is the material for making the films and $Al(CH_3)_3$ or $AlCl_3$ which is the material for making the films in an alternate manner.

According to the first to fourth methods of the invention, the insulating films formed by the chemical vapor deposition may be formed at a temperature in a range of 100 to 350° C.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 16A and FIG. 16B are cross sections for illustrating a step in a method of manufacturing a thin-film magnetic head of related art.

FIG. 17A and FIG. 17B are cross sections for illustrating a step that follows FIG. 16A and FIG. 16B.

FIG. 18A and FIG. 18B are cross sections for illustrating a step that follows FIG. 17A and FIG. 17B.

FIG. 19A and FIG. 19B are cross sections for illustrating a step that follows FIG. 18A and FIG. 18B.

FIG. 20A and FIG. 20B are cross sections for illustrating a step that follows FIG. 19A and FIG. 19B.

FIG. 21A and FIG. 21B are cross sections for illustrating a step that follows FIG. 20A and FIG. 20B.

DETAILED DESCRIPTION OF PREFERRED EMBODIMENTS

Figures 5A, 5B:
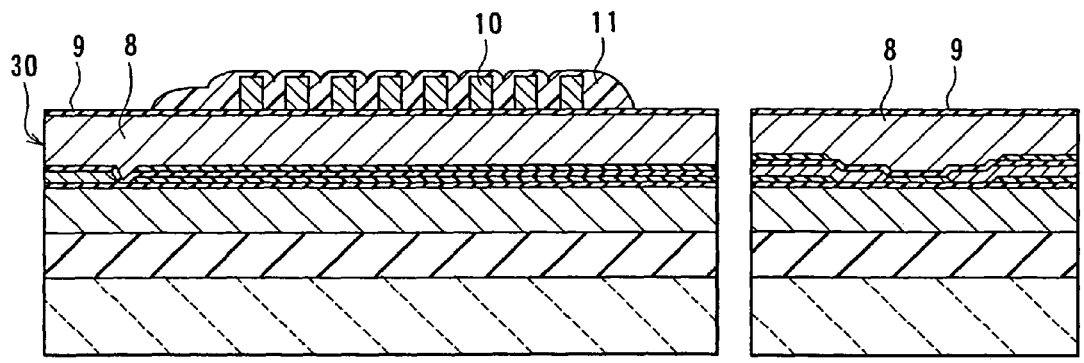
FIG. 5A and FIG. 5B are cross sections for illustrating a step that follows FIG. 4A and FIG. 4B.

Preferred embodiments of the invention will now be described in detail with reference to the accompanying drawings.

[First Embodiment]

Reference is now made to FIG. 1A to FIG. 8A, FIG. 1B to FIG. 8B, and FIG. 9 to describe a thin-film magnetic head and a method of manufacturing the same of a first embodiment of the invention. FIG. 1A to FIG. 8A are cross sections each orthogonal to the air bearing surface. FIG. 1B to FIG. 8B are cross sections of the pole portions of the head parallel to the air bearing surface.

In the method, as shown in FIG. 1A and FIG. 1B, an insulating layer 2 made of alumina ($Al_2O_3$), for example, of about 5 to 10 μm in thickness is deposited on a substrate 1 made of aluminum oxide and titanium carbide ($Al_2O_3$—TiC), for example. Next, on the insulating layer 2, a bottom shield layer 3 is formed for the reproducing head. The bottom shield layer 3 is made of a magnetic material and has a thickness of 2 to 3 μm, for example.

Next, as shown in FIG. 2A and FIG. 2B, a shield gap film 4a as an insulating film having a thickness of 10 to 15 nm, for example, is formed on the bottom shield layer 3. The shield gap film 4a is made of the insulating film in which a plurality of thin alumina films are stacked, each of the alumina films being formed through chemical vapor deposition (CVD). This insulating film is hereinafter called the multilayer CVD insulating film. The method of forming the shield gap layer 4a will be described later in detail.

Next, a shield gap film 4b, as an insulating film made of an insulating material such as alumina, having a thickness of 100 nm, for example, is formed on the shield gap film 4a except a region where a GMR element described later will be formed. The shield gap film 4b may be an insulating film formed through sputtering or a multilayer CVD insulating film. The shield gap film 4b is provided for preventing a short circuit between the GMR element and the bottom shield layer 3.

Next, on the shield gap film 4b, a film having a thickness of 40 to 50 nm, for example, for making up the GMR element for reproduction is formed through a method such as sputtering. This film is etched with a photoresist pattern not shown as a mask to form the GMR element 5.

Next, a pair of conductive layers (that may be called leads) 6 are formed by liftoff through the use of the above-mentioned photoresist pattern. The conductive layers 6 are electrically connected to the GMR element 5. The photoresist pattern is then removed.

Next, as shown in FIG. 3A and FIG. 3B, a shield gap film 7a, as an insulating film, having a thickness of 10 to 20 nm, for example, is formed on the shield gap films 4a and 4b, the GMR element 5 and the conductive layers 6. The GMR element 5 is embedded in the shield gap films 4a and 7a. The shield gap film 7a is made of a multilayer CVD insulating film. The method of forming the shield gap film 7a will be described later in detail.

Next, a shield gap film 7b as an insulating film made of an insulating material such as alumina and having a thickness of 100 nm, for example, is formed on the shield gap film 7a except the neighborhood of the GMR element 5. The shield gap film 7b may be an insulating film formed through sputtering or a multilayer CVD insulating film. The shield gap film 7b is provided for preventing a short circuit between the GMR element 5 and a top shield layer described later.

Next, as shown in FIG. 4A and FIG. 4B, on the shield gap films 7a and 7b, a top-shield-layer-cum-bottom-pole-layer (called a top shield layer in the following description) 8 is formed. The top shield layer 8 has a thickness of about 3 μm and is made of a magnetic material and used for both the reproducing head and the recording head.

Next, as shown in FIG. 5A and FIG. 5B, a recording gap layer 9 made of an insulating film such as an alumina film and having a thickness of 0.1 to 0.2 μm, for example, is formed on the top shield layer 8. The gap layer 9 may be an insulating film formed through sputtering or a multilayer CVD insulating film.

Next, on the recording gap layer 9, a thin-film coil 10 made of copper (Cu), for example, is formed through plating, for example, for the induction-type recording head. For example, the line width of the coil 10 is 0.5 to 0.8 μm, the space between neighboring ones of turns of the coil 10 is 0.5 μm, and the thickness of the coil 10 is 0.8 to 1.5 μm.

Next, a photoresist layer 11 is formed into a specific shape on the recording gap layer 9 and the coil 10. An end of the photoresist layer 11 facing toward the air bearing surface (the medium facing surface that faces toward a recording medium) 30 defines the throat height.

Figures 6A, 6B:
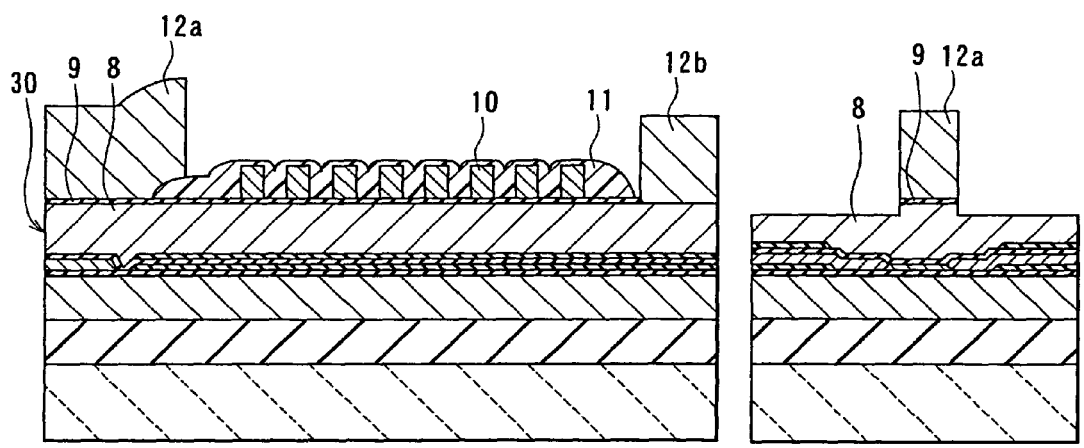
FIG. 6A and FIG. 6B are cross sections for illustrating a step that follows FIG. 5A and FIG. 5B.

Next, as shown in FIG. 6A and FIG. 6B, a portion of the recording gap layer 9 located in the center of the region where the thin-film coil 10 is formed is selectively etched to form a contact hole for making a magnetic path.

Next, a pole portion layer 12a including the pole portion of the top pole layer 12 is formed in a region extending from the top of a part of the recording gap layer 9 located in the pole portion to a part of the photoresist layer 11 close to the air baring surface 30. The pole portion layer 12a has a thickness of 2.5 to 3.5 μm, for example. At the same time, a magnetic layer 12b having a thickness of 2.5 to 3.5 μm, for example, is formed in the above-mentioned contact hole. The top pole layer 12 is made up of the pole portion layer 12a and the magnetic layer 12b and a yoke portion layer described later. The magnetic layer 12b is provided for connecting the yoke portion layer to the top shield layer 8.

The pole portion layer 12a and the magnetic layer 12b of the top pole layer 12 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Figures 7A, 7B:
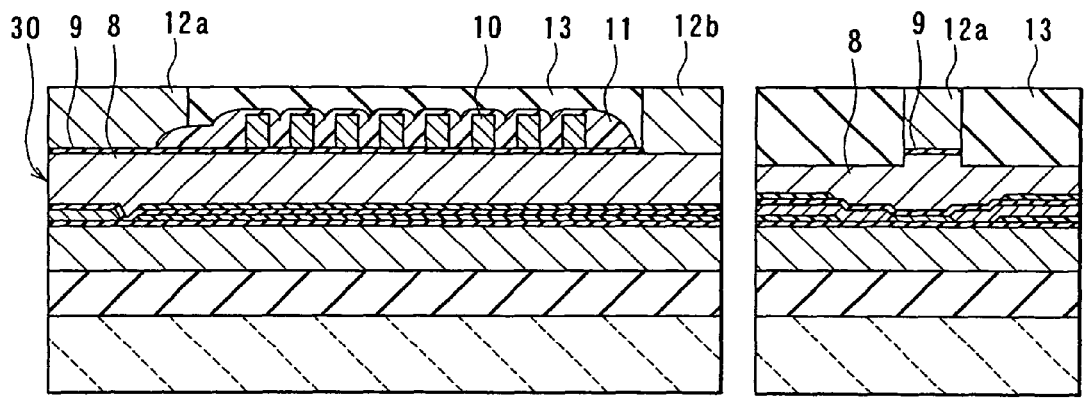
FIG. 7A and FIG. 7B are cross sections for illustrating a step that follows FIG. 6A and FIG. 6B.

Next, the recording gap layer 9 and a part of the top shield layer 8 are etched through ion milling, for example, using the pole portion layer 12a as a mask. As shown in FIG. 7B, the structure is called a trim structure wherein the sidewalls of the top pole portion (the pole portion layer 12a), the recording gap layer 9, and a part of the top shield layer 8 are formed vertically in a self-aligned manner. The trim structure suppresses an increase in the effective track width due to expansion of a magnetic flux generated during writing in a narrow track.

Next, an insulating layer 13 of alumina, for example, having a thickness of about 4 μm is formed over the entire surface. The insulating layer 13 is polished through chemical mechanical polishing (CMP), for example, to the surfaces of the pole portion layer 12a and the magnetic layer 12b and flattened.

Figures 8A, 8B:
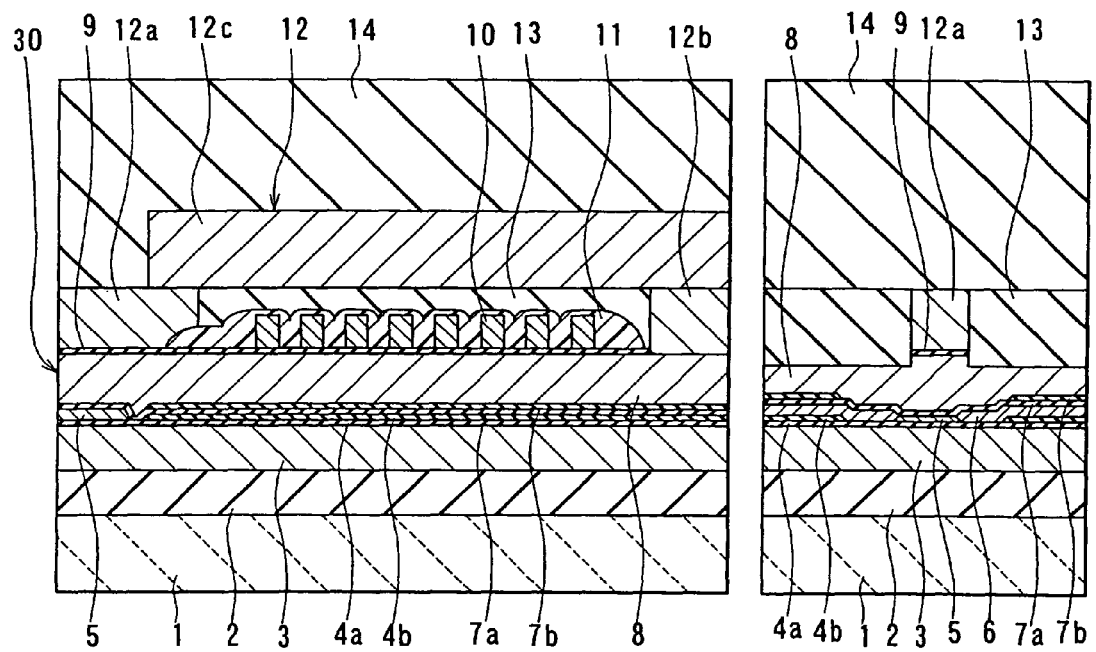
FIG. 8A and FIG. 8B are cross sections of the thin-film magnetic head of the first embodiment.

Next, as shown in FIG. 8A and FIG. 8B, the yoke portion layer 12c of the top pole layer 12 made of a magnetic material for the recording head is formed on the pole portion layer 12a, the insulating layer 13 and the magnetic layer 12b. The yoke portion layer 12c has a thickness of 3 μm, for example. The yoke portion layer 12c may be made of NiFe (80 weight % Ni and 20 weight % Fe) or a high saturation flux density material such as NiFe (45 weight % Ni and 55 weight % Fe) through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 12c may be made of a number of layers of inorganic insulating films and magnetic layers of Permalloy, for example.

Next, an overcoat layer 14 of alumina, for example, having a thickness of 20 to 40 μm, for example, is formed to cover the top pole layer 12. Finally, machine processing of the slider including the forgoing layers is performed to form the air bearing surface 30 of the thin-film magnetic head including the recording head and the reproducing head. The thin-film magnetic head is thus completed.

Figure 9:
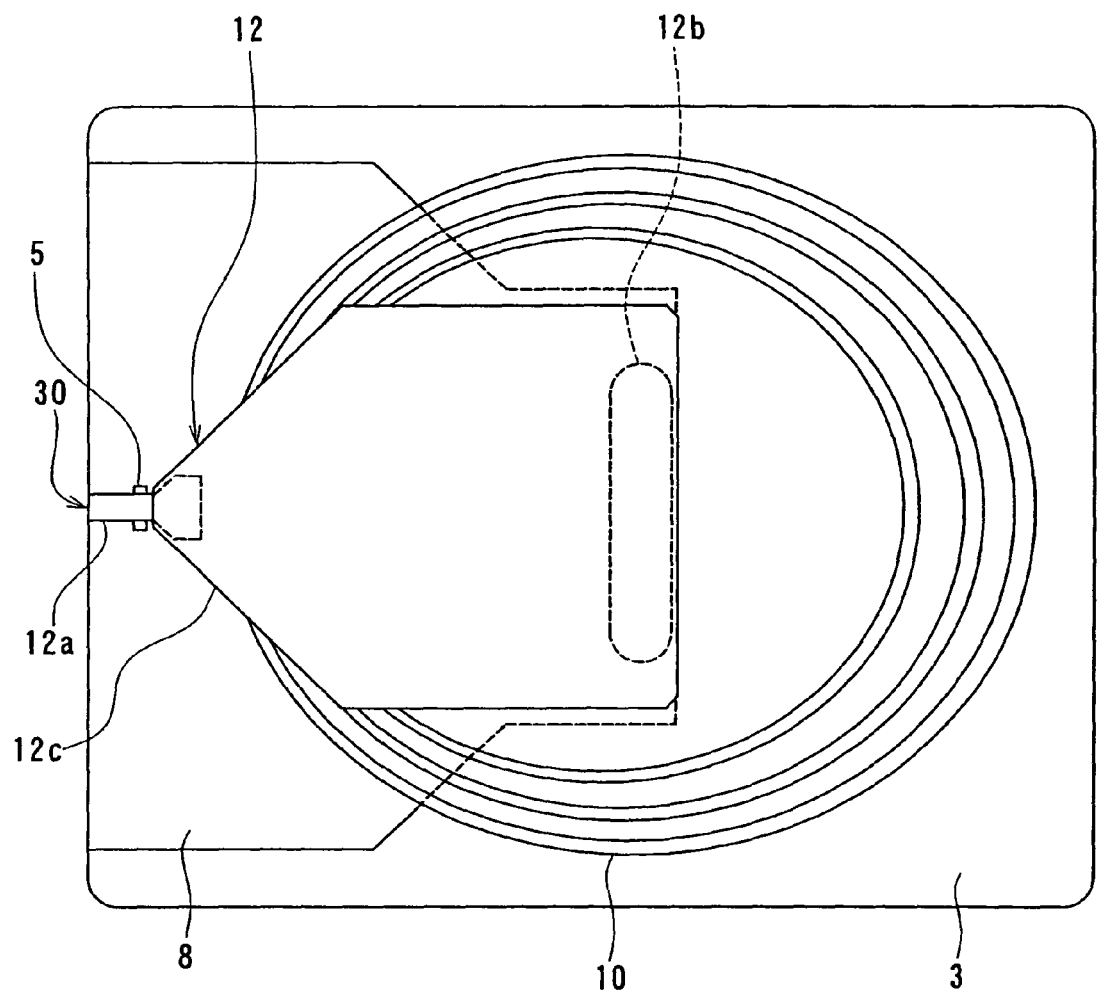
FIG. 9 is a top view of the thin-film magnetic head of the first embodiment.

FIG. 9 is a top view of the thin-film magnetic head shown in FIG. 8A and FIG. 8B. The overcoat layer 14 and the other insulating layers and film are omitted in FIG. 9. The pole portion of the pole portion layer 12a located on a side of the air bearing surface 30 has a width equal to the track width of the recording head.

In this embodiment the bottom shield layer 3 corresponds to the first shield layer of the invention. The top shield layer 8 corresponds to the second shield layer of the invention. Since the top shield layer 8 functions as the bottom pole layer, too, the top shield layer 8 corresponds to the first magnetic layer of the invention, too. The top pole layer 12 corresponds to the second magnetic layer of the invention, too. The shield gap film 4a corresponds to the first shield gap film of the invention. The shield gap film 7a corresponds to the second shield gap film of the invention.

The thin-film magnetic head of this embodiment comprises the air bearing surface 30, that is, the medium facing surface that faces toward a recording medium, the reproducing head and the recording head (induction-type electromagnetic transducer). The reproducing head includes the GMR element 5 and the bottom shield layer 3 and the top shield layer 8 for shielding the GMR element 5. Portions of the bottom shield layer 3 and the top shield layer 8 on a side of the air bearing surface 30 are opposed to each other while the GMR element 5 is placed between these portions of the bottom shield layer 3 and the top shield layer 8. The reproducing head further includes: the conductive layers 6 connected to the GMR element 5; the shield gap films 4a and 4b provided between the bottom shield layer 3 and the GMR element 5 together with the conductive layers 6; and the shield gap films 7a and 7b provided between the top shield layer 8 and the GMR element 5 together with the conductive layers 6.

The recording head includes the bottom pole layer (the top shield layer 8) and the top pole layer 12 magnetically coupled to each other each of which includes at least one layer. The bottom pole layer and the top pole layer 12 include pole portions opposed to each other and located in regions on a side of the air bearing surface 30. The recording head further includes: the recording gap layer 9 placed between the pole portion of the bottom pole layer and the pole portion of the top pole layer 12; and the thin-film coil 10 at least a part of which is placed between the bottom pole layer and the top pole layer 12, the at least part of the coil 10 being insulated from the bottom pole layer and the top pole layer 12.

The following is a description of two examples of the method of forming a multilayer CVD insulating film that is utilized as each of the shield gap films 4a and 7a of the embodiment of the invention.

Figure 10:
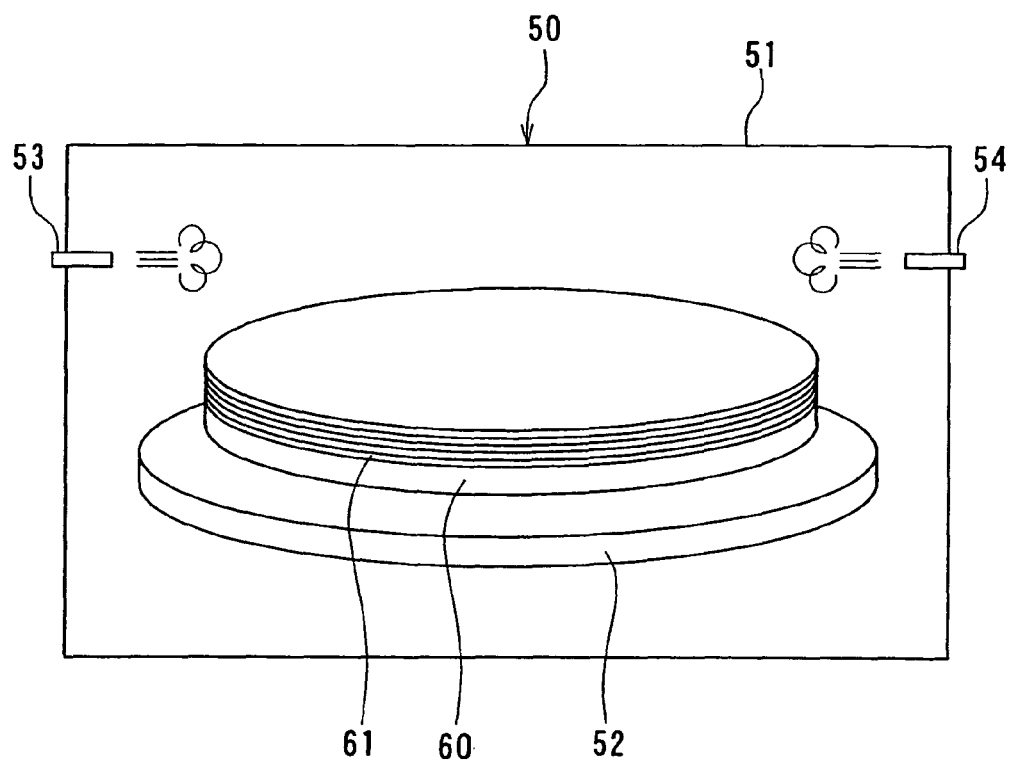
FIG. 10 illustrates a first example of a method of forming a multilayer CVD insulating film of the first embodiment of the invention.

FIG. 10 illustrates the first example of the method of forming a multilayer CVD insulating film. In this example the multilayer CVD insulating film is formed by performing the step of making a thin alumina film by low pressure CVD a plurality of times. Such a method of forming an insulating film is described in 'Microelectronic Engineering 36' (1997), pp. 91-94, for example.

In the first example, as shown in FIG. 10, a thin alumina film is formed on a substrate 60 through the use of a low pressure CVD apparatus 50. This substrate 60 means a structure including the substrate 1 and the layers stacked thereon in the steps preceding formation of the insulating film to be obtained. In a chamber 51 of the low pressure CVD apparatus 50, a chuck 52 is provided for fixing the object on which the thin film is to be formed. A heater not shown for heating the chuck 52 is provided below the chuck 52. The chamber 51 has two nozzles 53 and 54 for injecting a material for making thin films into the chamber 51.

In the first example the substrate 60 is fixed on the top surface of the chuck 52 in the chamber 51 of the low pressure CVD apparatus 50. When a multilayer CVD insulating film is formed on the substrate 60, the chuck 52 and the substrate 60 are maintained at a temperature in the range of 100 to 350° C., or preferably in the range of 150 to 250° C. Therefore, thin alumina films making up the multilayer CVD insulating film are formed at a temperature in the range of 100 to 350° C., or preferably in the range of 150 to 250° C. The degree of vacuum inside the chamber 51 is maintained at about 10-3 to 10-5 Pa.

In the first example the following steps are alternately repeated. The step first taken is to inject a material for making a thin film, that is, $H_2O$, $N_2O$ or $H_2O_2$ through the nozzle 53, for example, onto the substrate 60 for a short period of time, the material being carried by bubbles of a purge gas of $N_2$. The next step is to inject a material for making the thin film, that is, $Al(CH_3)_3$ (trimethylaluminum) or $AlCl_3$ through the nozzle 54, for example, onto the substrate 60 for a short period of time, the material being carried by bubbles of a purge gas of $N_2$. In the first example the materials for making thin films are intermittently injected onto the substrate 60. The flow rate of one injection of $H_2O$, $N_2O$ or $H_2O_2$ is 0.25 to 0.5 mg, for example. The flow rate of one injection of $Al(CH_3)_3$ or $AlCl_3$ is 0.1 to 0.2 mg, for example. One cycle is the combination of one injection of $H_2O$, $N_2O$ or $H_2O_2$ and one injection of $Al(CH_3)_3$ or $AlCl_3$. The duration of one cycle is about 2 seconds, for example. Through the cycle, an alumina film as thin as 0.1 to 0.2 nm, for example, is formed on the substrate 60 by a chemical reaction between $H_2O$, $N_2O$ or $H_2O_2$ and $Al(CH_3)_3$ or $AlCl_3$. In the first example a plurality of cycles are performed to stack a plurality of thin alumina films. A multilayer CVD insulating film having a desired thickness is thereby formed.

Figure 11:
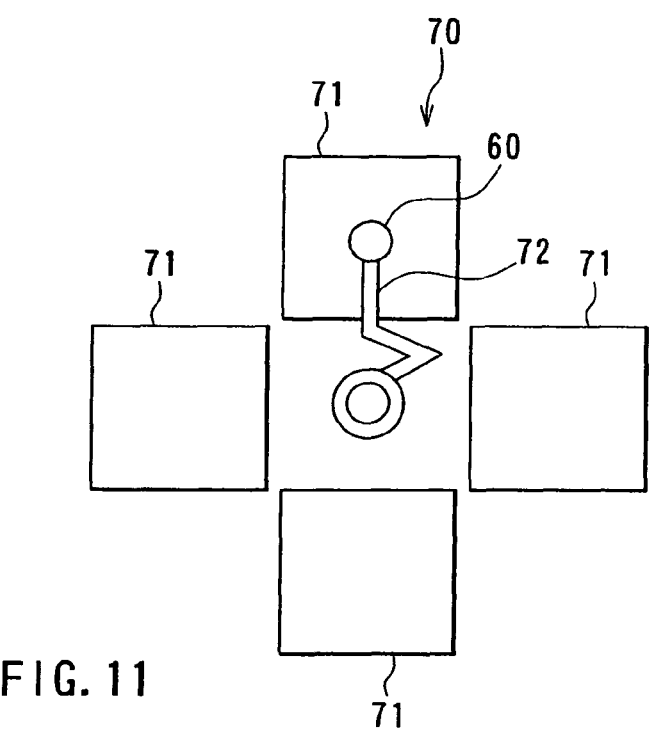
FIG. 11 illustrates a second example of the method of forming the multilayer CVD insulating film of the first embodiment.

FIG. 11 illustrates the second example of the method of forming a multilayer CVD insulating film. In this example the multilayer CVD insulating film is formed by performing the step of making a thin alumina film by CVD a plurality of times through the use of a plurality of chambers. In the second example, as shown in FIG. 11, thin alumina films are formed on the substrate 60 through the use of a multi-chamber CVD apparatus 70. The CVD apparatus 70 comprises a plurality of chambers 71 and a transfer device 72 for loading and unloading the object on which thin films are to be formed in and out of the chambers 71. Each of the chambers 71 is designed to form a desired thin film on the object by plasma CVD, for example.

In the second example the substrate 60 is transferred to one of the chambers 71 by the transfer device 72. In this chamber 71a thin alumina film is formed on the substrate 60 through the use of $O_2$ and $Al(CH)_3$, for example. The degree of vacuum inside each of the chambers 71 is maintained at about 103 Pa, for example. The substrate 60 in each of the chambers 71 is maintained at a temperature in the range of 100 to 350° C., or preferably in the range of 200 to 250° C. In each of the chambers 71 the alumina film formed on the substrate 60 has a thickness of 0.5 to 1.5 nm, for example.

In the second example the substrate 60 on which the thin alumina film is formed as described above is transferred to another one of the chambers 71 by the transfer device 72. In this one of the chambers 71 another alumina film is formed on the substrate 60 as in the first one of the chambers 71. In the second example the substrate 60 is transferred among the chambers 71 in each of which a thin alumina film is formed on the substrate 60 in a similar manner. According to the second example as thus described, the step of forming a thin alumina film is performed a plurality of times through the use of a plurality of chambers 71. A multilayer CVD insulating film is thereby formed.

In the second example atmospheric CVD may be used instead of plasma CVD. The foregoing first and second examples are not limited to the insulating films making up the shield gap films 4a and 7a but may be applied to the insulating films making up the shield gap films 4b and 7b and to the insulating film making up the recording gap layer 9.

Compared to an insulating film formed through sputtering, the multilayer CVD insulating film formed through the method such as the foregoing first or second example is more closely packed and has a more even thickness, greater insulation strength and better step coverage owing to the closely packed structure. Since the multilayer CVD insulating film has such qualities, it is possible to reduce the thickness thereof without reducing the qualities, compared to the insulating film formed through sputtering.

The following is a description of the result of experiment performed for comparing center line average height Ra of an insulating film formed through sputtering and that of the multilayer CVD insulating film of the embodiment of the invention. The center line average height Ra indicates evenness of the thickness. In this experiment the average height Ra of the insulating film formed through sputtering and having a thickness of 30 nm, and that of the multilayer CVD insulating film having a thickness of 30 nm were obtained. The result was that the average height Ra of the insulating film formed through sputtering was 0.216 nm while the average height Ra of the multilayer CVD insulating film was 0.107 nm. This result shows that the evenness of the thickness of the multilayer CVD insulating film was better than that of the insulating film formed through sputtering.

Figure 12:
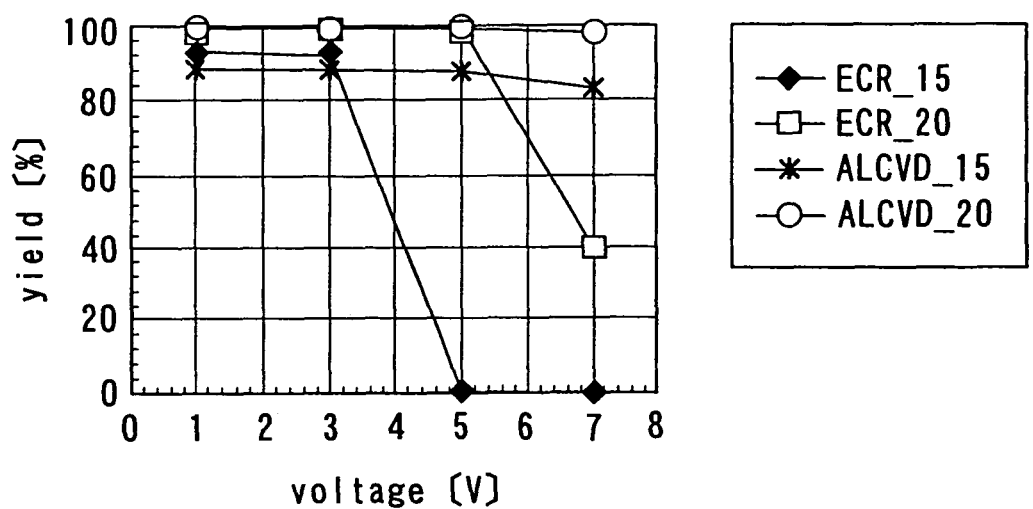
FIG. 12 is a plot for showing the result of experiment performed for comparing the insulation strength of an insulating film formed through sputtering and that of the multilayer CVD insulating film of the first embodiment of the invention.

Reference is now made to FIG. 12 to describe the result of experiment performed for comparing the insulation strength of an insulating film formed through sputtering and that of the multilayer CVD insulating film of the embodiment of the invention. FIG. 12 shows the relationship between the voltage applied to four types of insulating films and the percentage of insulating films in which no puncture occurred (which is indicated as yield in FIG. 12). The four types of insulating films were: an alumina film (indicated as ECR_15 in FIG. 12) having a thickness of 15 nm and formed through continuous sputtering through the use of an electron cyclotron resonance (ECR) sputtering apparatus; an alumina film (indicated as ECR_20 in FIG. 12) having a thickness of 20 nm and formed through continuous sputtering through the use of the ECR sputtering apparatus; a multilayer CVD insulating film (indicated as ALCVD_15 in FIG. 12) having a thickness of 15 nm and formed through performing the step of forming a thin alumina film by low pressure CVD a plurality of times; and a multilayer CVD insulating film (indicated as ALCVD_20 in FIG. 12) having a thickness of 20 nm and formed through performing the step of forming a thin alumina film by low pressure CVD a plurality of times.

As shown in FIG. 12, the alumina film formed through continuous sputtering through the use of the ECR sputtering apparatus had an insulation strength of about 5 volts when the thickness was 20 nm, and an insulation strength of about 3 volts when the thickness was 15 nm. Either case was unpractical since the film was likely to suffer static damage. In contrast, the multilayer CVD insulating film had an insulation strength of 7 volts or greater when the thickness was either 20 nm or 15 nm, and it was unlikely to suffer static damage.

Figure 13:
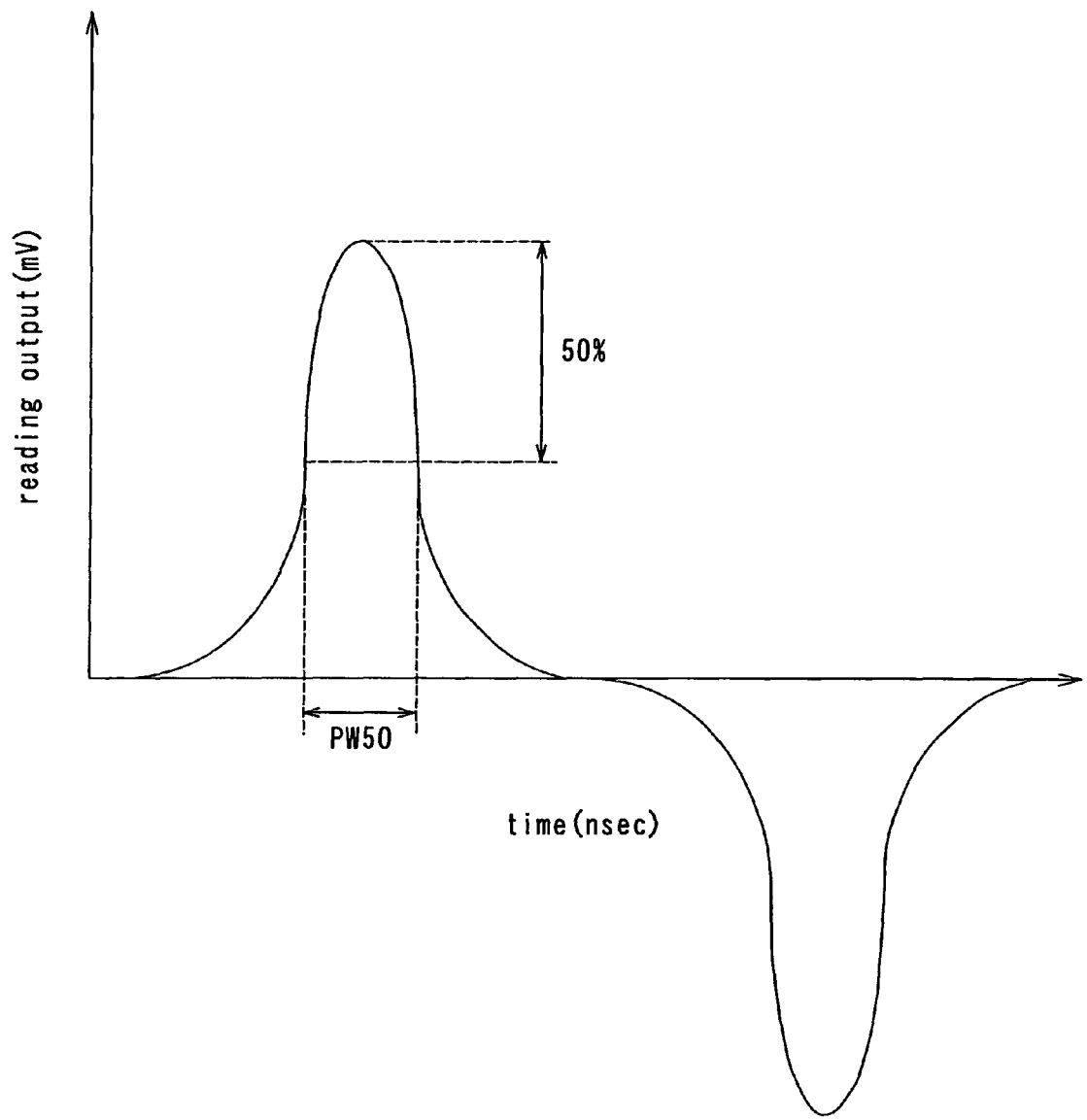
FIG. 13 is a plot for illustrating an example of waveform of reading output of the thin-film magnetic head of the first embodiment.

According to the embodiment thus described, each of the shield gap films 4a and 7a is made of the multilayer CVD insulating film made up of a plurality of thin alumina films stacked that are formed by CVD. As described above, the multilayer CVD insulating film is closely packed and has an even thickness, greater insulation strength and excellent step coverage. It is thus possible to reduce the thickness thereof. As a result, according to the embodiment, it is possible to make the thickness of each of the shield gap films 4a and 7a smaller than that of a prior-art shield gap film, and to reduce the shield gap length. Furthermore, a reduction in the shield gap length results in a reduction in half width of the reading output. It is thereby possible to improve the recording density. FIG. 13 illustrates an example of waveform of reading output of the thin-film magnetic head of the embodiment, wherein PW50 indicates the half width of the reading output. The half width PW50 is a period of time required for the reading output to reach 50% or greater of the peak value.

The shield gap film 7a is formed in regions having projections and depressions, such as the neighborhood of the pattern edge of the GMR element 5 or the neighborhood of the conductive layers 6 connected to the GMR element 5. Therefore, pinholes and faulty insulation are likely to result if step coverage is unsatisfactory. In this embodiment, however, the shield gap film 7a is made of the multilayer CVD insulating film that exhibits excellent step coverage. It is thereby possible to prevent pinholes and faulty insulation in the shield gap film 7a.

According to the embodiment, the shield gap films 4a and 7a that are thin and have high qualities are formed. It is thereby possible to improve the yield of thin-film magnetic heads for high density recording.

The foregoing features of the embodiment improve the performance characteristics and yield of thin-film magnetic heads.

In the embodiment not only the shield gap films 4a and 7a but also the shield gap films 4b and 7b and the recording gap layer 9 may be made of multilayer CVD insulating films. It is thereby possible to reduce the thickness of these layers and to improve the qualities thereof, and to further improve the characteristics and yield of thin-film magnetic heads.

Second Embodiment

Figures 14A, 14B:
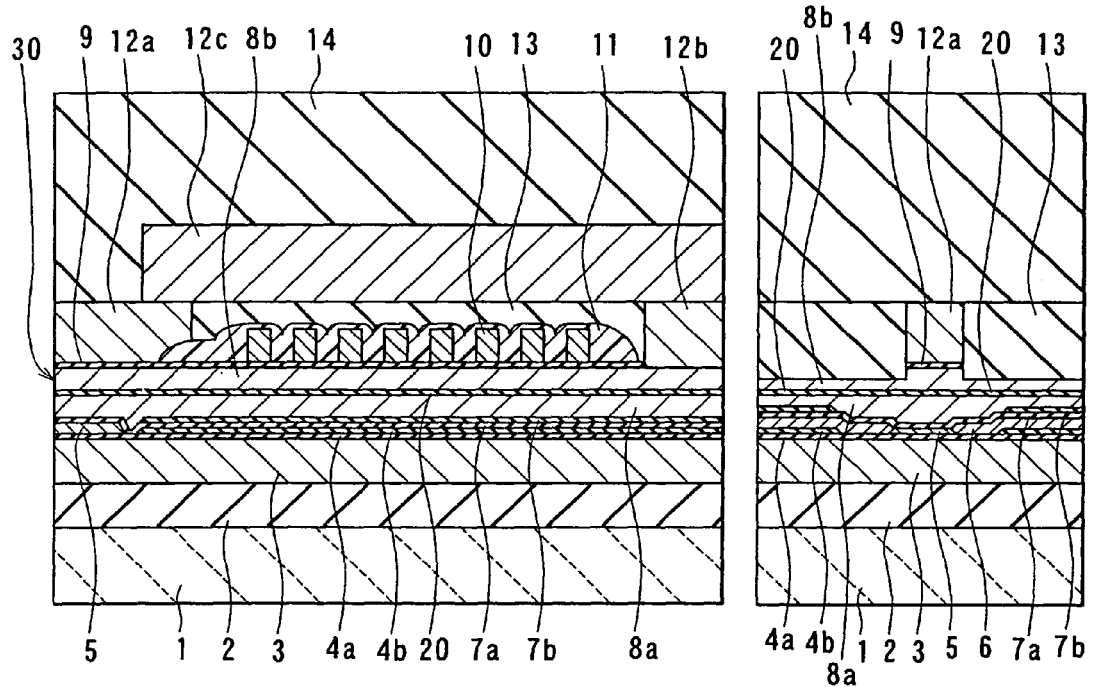
FIG. 14A and FIG. 14B are cross sections of a thin-film magnetic head of a second embodiment of the invention.

Reference is now made to FIG. 14A and FIG. 14B to describe a thin-film magnetic head and a method of manufacturing the same of a second embodiment of the invention. FIG. 14A is a cross section orthogonal to the air bearing surface. FIG. 14B is a cross section of the pole portions of the head parallel to the air bearing surface.

In place of the top shield layer 8 of the first embodiment, the thin-film magnetic head of the second embodiment comprises: a top shield layer 8a made of a magnetic material; an isolation film 20; and a bottom pole layer 8b made of a magnetic material. The isolation film 20 is an insulating film that magnetically isolates the reproducing head and the recording head from each other.

In the method of the second embodiment, the top shield layer 8a is formed on the shield gap films 7a and 7b. Next, the isolation film 20 is formed on the top shield layer 8a. The bottom pole layer 8b is then formed on the isolation film 20. The isolation film 20 has a thickness of 0.1 to 0.2 µm, for example.

The isolation film 20 is made of a multilayer CVD insulating film made up of a plurality of thin alumina films stacked that are formed by CVD, which is similar to the shield gap films 4a and 7a of the first embodiment.

According to the second embodiment, the isolation film 20 magnetically isolates the reproducing head and the recording head from each other. It is thereby possible to reduce noise such as Barkhausen noise of the reproducing head resulting from a writing operation of the recording head, and to reduce variations in reading output.

According to the embodiment, the isolation film 20 is made of the multilayer CVD insulating film. The isolation film 20 is therefore thin and of high quality. It is thus possible to improve the performance characteristics and yield of thin-film magnetic heads.

The remainder of configuration, functions and effects of the embodiment are similar to those of the first embodiment.

Third Embodiment

Figures 15A, 15B:
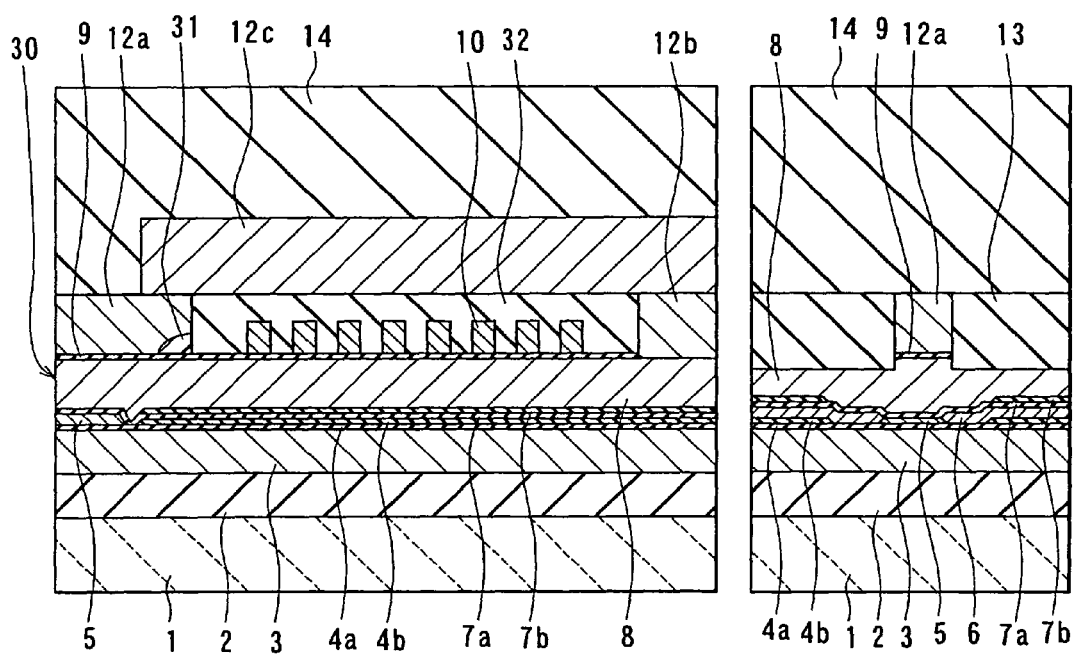
FIG. 15A and FIG. 15B are cross sections of a thin-film magnetic head of a third embodiment of the invention.
Figures 22A, 22B:
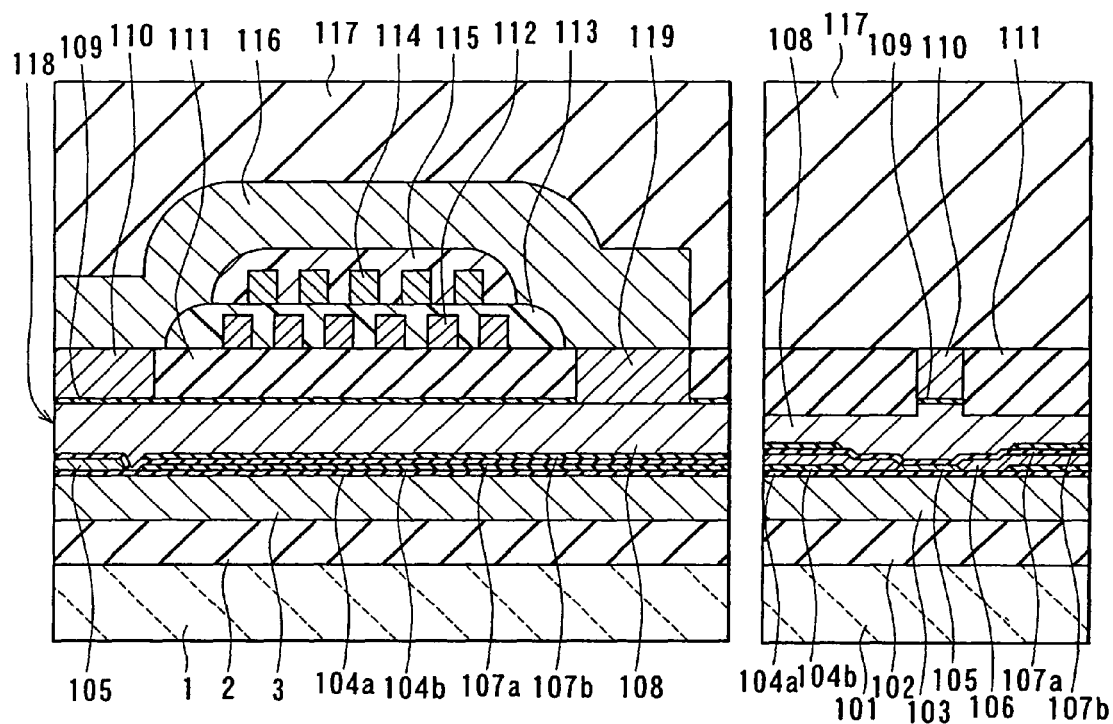
FIG. 22A and FIG. 22B are cross sections for illustrating a step that follows FIG. 21A and FIG. 21B.
Figure 23:
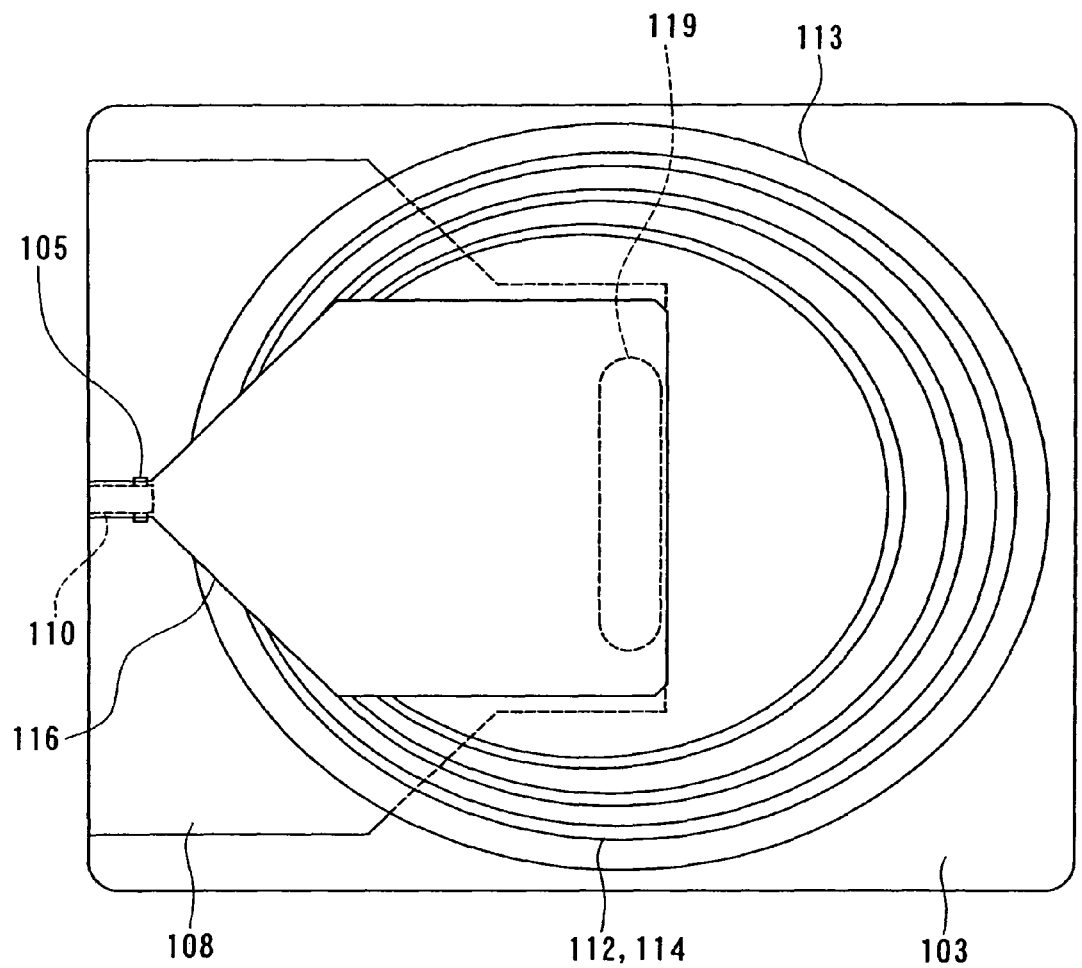
FIG. 23 is a top view of the related-art thin-film magnetic head.

Reference is now made to FIG. 15A and FIG. 15B to describe a thin-film magnetic head and a method of manufacturing the same of a third embodiment of the invention. FIG. 15A is a cross section orthogonal to the air bearing surface. FIG. 15B is a cross section of the pole portions of the head parallel to the air bearing surface.

In place of the photoresist layer 11 and the insulating layer 13 of the first embodiment, the thin-film magnetic head of the third embodiment comprises a photoresist layer 31 and a coil insulating layer 32. The photoresist layer 31 is not formed between the recording gap layer 9 and the thin-film coil 10, but formed only between the recording gap layer 9 and a part of the pole portion layer 12a of the top pole layer 12. In this embodiment the coil 10 is located on the recording gap layer 9. The coil insulating layer 32 covers the coil 10 and insulates neighboring ones of the turns of the coil 10 from each other.

In this embodiment an end of the photoresist layer 3.1 facing toward the air bearing surface 30 defines the throat height.

The coil insulating layer 32 is made of a multilayer CVD insulating film made up of a plurality of thin alumina films stacked that are formed by CVD, which is similar to the shield gap films 4a and 7a of the first embodiment.

In the method of the third embodiment, the photoresist layer 31 is formed on the recording gap layer 9. Next, the pole portion layer 12a of the top pole layer 12 is formed on the recording gap layer 9 and the photoresist layer 31. At the same time, the magnetic layer 12b is formed in the contact hole formed in the recording gap layer 9. Next, the recording gap layer 9 and a part of the top shield layer 8 are etched by ion milling, for example, with the pole portion layer 12a as a mask. A trim structure is thereby formed. Next, the thin-film coil 10 is formed on the recording gap layer 9. The coil insulating layer 32 of a multilayer CVD insulating film is then formed over the entire surface. The coil insulating layer 32 is polished through CMP, for example, to the surfaces of the pole portion layer 12a and the magnetic layer 12b, and flattened. The following steps are similar to those of the first embodiment.

According to the embodiment, the coil insulating layer 32 insulating neighboring ones of the turns of the coil 10 from each other is made of the multilayer CVD insulating film that exhibits excellent step coverage. As a result, the insulating film without keyholes and voids is formed to fill the space between neighboring ones of the turns of the coil 10. It is thereby possible to improve the performance characteristics and yield of thin-film magnetic heads.

The remainder of configuration, functions and effects of the third embodiment are similar to those of the first embodiment.

The present invention is not limited to the foregoing embodiments but may be practiced in still other ways. For example, the invention is not limited to a thin-film magnetic head in which the MR element is a GMR element but may be applied to a thin-film magnetic head in which the MR element is an AMR element or a tunnel magnetoresistive (TMR) element.

In the foregoing embodiments, the thin-film magnetic head is disclosed, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with the recording gap film in between. In this case it is possible that the top pole layer of the induction-type electromagnetic transducer functions as the bottom shield layer of the MR element, too.

The invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

According to the first thin-film magnetic head or the method of manufacturing the same of the invention thus described, at least one of the first and second shield gap films is made of a plurality of insulating films stacked that are formed by chemical vapor deposition. It is thereby possible to improve the quality of at least one of the first and second shield gap films, and to improve the performance characteristics and yield of thin-film magnetic heads. In addition, the invention achieves a reduction in shield gap length. Recording density is thereby improved.

According to the second thin-film magnetic head or the method of manufacturing the same of the invention, the gap layer of the recording head is made of a plurality of insulating films stacked that are formed by chemical vapor deposition. The gap layer is thus made of a high quality insulating film. It is thereby possible to improve the performance characteristics and yield of thin-film magnetic heads.

According to the third thin-film magnetic head or the method of manufacturing the same of the invention, the isolation film isolating the reproducing head from the recording head is made of a plurality of insulating films stacked that are formed by chemical vapor deposition. The isolation film is thus made of a high quality insulating film. It is thereby possible to improve the performance characteristics and yield of thin-film magnetic heads.

According to the fourth thin-film magnetic head or the method of manufacturing the same of the invention, the coil insulating layer insulating neighboring ones of turns of the thin-film coil from each other is made of a plurality of insulating films stacked that are formed by chemical vapor deposition. The coil insulating layer is thus made of a high quality insulating film. It is thereby possible to improve the performance characteristics and yield of thin-film magnetic heads.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head, the thin-film magnetic head comprising:
   a medium facing surface that faces toward a recording medium;
   a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer;
   a gap layer provided between the pole portions of the first and second magnetic layers;
   a thin-film coil at least a part of which is placed between the first and second magnetic layers, the at least part of the coil being insulated from the first and second magnetic layers; and
   a coil insulating layer for insulating neighboring ones of turns of the coil from each other, the method comprising the steps of:
      forming the first magnetic layer;
      forming the gap layer on the first magnetic layer;
      forming the second magnetic layer on the gap layer;
      forming the thin-film coil; and
      forming the coil insulating layer,
   wherein the coil insulating layer is formed by stacking a plurality of insulating films formed by chemical vapor deposition, and
   each of the plurality of insulating films has a thickness of 0.1 to 0.2 nm.

2. The method according to claim 1, wherein the insulating films formed by the chemical vapor deposition are alumina films.

3. The method according to claim 1, wherein the chemical vapor deposition is low pressure chemical vapor deposition.

4. The method according to claim 1, wherein the chemical vapor deposition is plasma chemical vapor deposition or atmospheric pressure chemical vapor deposition.

5. The method according to claim 1, wherein the insulating films formed by the chemical vapor deposition are formed through the use of a plurality of chambers.

6. The method according to claim 1, wherein the insulating films formed by the chemical vapor deposition are formed through intermittently injecting a material for making the films.

7. The method according to claim 6, wherein the insulating films formed by the chemical vapor deposition are alumina films formed through injecting a first material and a second material in an alternate manner, wherein the first material is selected from the group consisting of $H_2O$, $N_2O$ and $H_2O_2$ and the second material is selected from the group consisting of $Al(CH_3)_3$ and $AlCl_3$.

8. The method according to claim 1, wherein the insulating films formed by the chemical vapor deposition are formed at a temperature in a range of 100° C. to 350° C.

* * * * *